(12) United States Patent
Sato et al.

(10) Patent No.: US 8,462,216 B2
(45) Date of Patent: Jun. 11, 2013

(54) OPTICAL APPARATUS AND CAMERA SYSTEM HAVING A FUNCTION OF MOVING A FOCUS LENS IN AN OPTICAL AXIS DIRECTION TO REDUCE FOCUS SHAKE GENERATED IN THE OPTICAL AXIS DIRECTION

(75) Inventors: Shigeki Sato, Utsunomiya (JP); Masanori Ishikawa, Saitama (JP); Atsushi Koyama, Utsunomiya (JP); Kunihiko Sasaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/567,894

(22) Filed: Aug. 6, 2012

(65) Prior Publication Data

US 2012/0293675 A1 Nov. 22, 2012

Related U.S. Application Data (62) Division of application No. 12/508,391, filed on Jul. 23, 2009, now Pat. No. 8,259,182.

(30) Foreign Application Priority Data

Aug. 1, 2008 (JP) .................................. 2008-200089

(51) Int. Cl.
H04N 5/228 (2006.01)
(52) U.S. Cl.
USPC .................................................. 348/208.12
(58) Field of Classification Search
USPC ............... 348/208.11, 208.4, 208.12; 396/52, 396/55
See application file for complete search history.

(56) References Cited

U.S. PATENT DOCUMENTS

| 5,144,355 | A  | * | 9/1992 | Hamada et al. ................. 396/95 |
| 5,237,365 | A  | * | 8/1993 | Miyazawa ...................... 396/49 |
| 7,474,843 | B2 | * | 1/2009 | Miura ............................. 396/52 |
| 7,907,205 | B2 | * | 3/2011 | Okada ........................... 348/345 |
| 2002/0015587 | A1 | * | 2/2002 | Ohishi et al. .................... 396/55 |
| 2002/0163581 | A1 | * | 11/2002 | Kitazawa et al. .......... 348/208.6 |
| 2005/0140793 | A1 | * | 6/2005 | Kojima et al. ........... 348/208.99 |
| 2005/0276590 | A1 | * | 12/2005 | Ishikawa et al. ............... 396/55 |
| 2006/0033817 | A1 | * | 2/2006 | Ishikawa et al. ........... 348/208.2 |
| 2008/0231714 | A1 | * | 9/2008 | Estevez et al. ........... 348/208.16 |
| 2009/0087174 | A1 | * | 4/2009 | Otsuka ............................ 396/55 |
| 2009/0251548 | A1 | * | 10/2009 | Honjo et al. ............... 348/208.4 |

FOREIGN PATENT DOCUMENTS

| JP | 08262517 A | * | 10/1996 |
| JP | 11084447 A | * | 3/1999 |
| JP | 2007114466 A | * | 5/2007 |

* cited by examiner

*Primary Examiner* — Roberto Velez
*Assistant Examiner* — Gary C Vieaux
(74) *Attorney, Agent, or Firm* — Canon USA Inc IP Division (57) ABSTRACT

The optical apparatus includes an image pickup optical system including a focus lens, a controller controlling movement of the focus lens in an optical axis direction of the image pickup optical system, a shake detector detecting a shake amount of the optical apparatus in the optical axis direction, and a memory storing plural shake amounts sequentially detected by the shake detector. The controller calculates, in response to a start instruction of exposure for the image pickup and before start of the exposure, a predictive value of the shake amount for a time point of the exposure based on the plural shake amounts stored in the memory and including at least one shake amount detected after the start instruction of exposure. The controller moves the focus lens to a position corresponding to the predictive value before the start of the exposure.

14 Claims, 4 Drawing Sheets

OPTICAL APPARATUS AND CAMERA SYSTEM HAVING A FUNCTION OF MOVING A FOCUS LENS IN AN OPTICAL AXIS DIRECTION TO REDUCE FOCUS SHAKE GENERATED IN THE OPTICAL AXIS DIRECTION

CROSS-REFERENCE TO RELATED APPLICATIONS

The present application is a divisional of U.S. patent application Ser. No. 12/508,391, filed Jul. 23, 2009, entitled "OPTICAL APPARATUS AND CAMERA SYSTEM HAVING A FUNCTION OF MOVING A FOCUS LENS IN AN OPTICAL AXIS DIRECTION TO REDUCE FOCUS SHAKE", the content of which is expressly incorporated by reference herein in its entirety. Further, the present application claims the benefit of Japanese Patent Application No. 2008-200089, filed on Aug. 1, 2008, which is hereby incorporated by reference herein in its entirety.

BACKGROUND OF THE INVENTION

1. Field of the Invention

The present invention relates to an optical apparatus such as a digital camera and an interchangeable lens, and in particular relates to an optical apparatus having a function of moving a focus lens in an optical axis direction to reduce "focus shake" generated in the optical axis direction.

2. Description of the Related Art

Optical apparatuses used for image pickup generally have a so-called image stabilization function to reduce image shake caused by camera shake such as hand jiggling. The camera shake is detected using a shake detection sensor such as an angular velocity sensor and an acceleration sensor. The image shake caused by angular camera shake (camera shake in a pitch direction and a yaw direction) is reduced by shifting part of an image pickup optical system in a direction orthogonal to the optical axis direction according to a detection result by the shake detection sensor.

When a user holds a camera by hand and performs image pickup with a high image pickup magnification such as macro image pickup, defocusing from an object may occur due to a small shake in the optical axis direction (that is, "focus shake") of the camera since a depth of field of the image pickup optical system becomes small. Such focus shake can be corrected by moving a focus lens in the optical axis direction according to variations of a focus state detected by a focus detection unit.

However, in a single lens reflex camera including a quick return mirror, the quick return mirror is moved out of an image pickup optical path in a period from a time point of a switch operation (for example, a second stroke operation of a release button) for instructing start of exposure to a time point of an open operation of a shutter for starting the exposure. The movement of the quick return mirror out of the image pickup optical path disables detection of the focus state since light from the object does not reach the focus detection unit.

Japanese patent No. 3799666 discloses a camera which has a displacement sensor that detects displacements of the camera in an optical axis direction, and which moves a focus lens included in an image pickup optical system on the basis of a detection result by a focus detection unit and also moves the focus lens during exposure on the basis of a detection result by the displacement sensor.

Moreover, Japanese Patent Laid-Open No. 2006-162682 discloses a camera which performs focus detection by a focus detection unit plural times before a start instruction of exposure, and which starts drive of a focus lens before start of exposure on the basis of a result of the last focus detection.

However, to move the focus lens during the exposure as disclosed in Japanese patent No. 3799666, it is necessary that a magnification of the image pickup optical system be not changed by the movement of the focus lens. In other words, a method disclosed in Japanese patent No. 3799666 cannot be used for an optical apparatus whose image pickup magnification is varied by the movement of the focus lens.

Further, even if using the result of the last focus detection in the plural focus detections performed before the start instruction of exposure as disclosed in Japanese Patent Laid-Open No. 2006-162682, the focus shake occurring before start of exposure may affect a captured image.

SUMMARY OF THE INVENTION

The present invention provides an optical apparatus and a camera system each capable of further reducing an effect of focus shake on an image captured by image pickup, regardless of presence of magnification variations caused by movement of a focus lens.

The present invention provides as one aspect thereof an optical apparatus used for image pickup which includes an image pickup optical system including a focus lens, a controller configured to control movement of the focus lens in an optical axis direction of the image pickup optical system, a shake detector configured to detect a shake amount of the optical apparatus in the optical axis direction, and a memory configured to store plural shake amounts sequentially detected by the shake detector. The controller calculates, in response to a start instruction of exposure for the image pickup and before start of the exposure, a predictive value of the shake amount for a time point of the exposure based on the plural shake amounts stored in the memory and including at least the shake amount detected after the start instruction of exposure. The controller moves the focus lens to a position corresponding to the predictive value before the start of the exposure.

The present invention provides as another aspect thereof a camera system which includes an image pickup apparatus and interchangeable lens that is the above-described optical apparatus.

Other aspects of the present invention will become apparent from the following description and the attached drawings.

DESCRIPTION OF THE EMBODIMENTS

Exemplary embodiments of the present invention will hereinafter be described with reference to the accompanying drawings.

Embodiment 1

Figure 1:
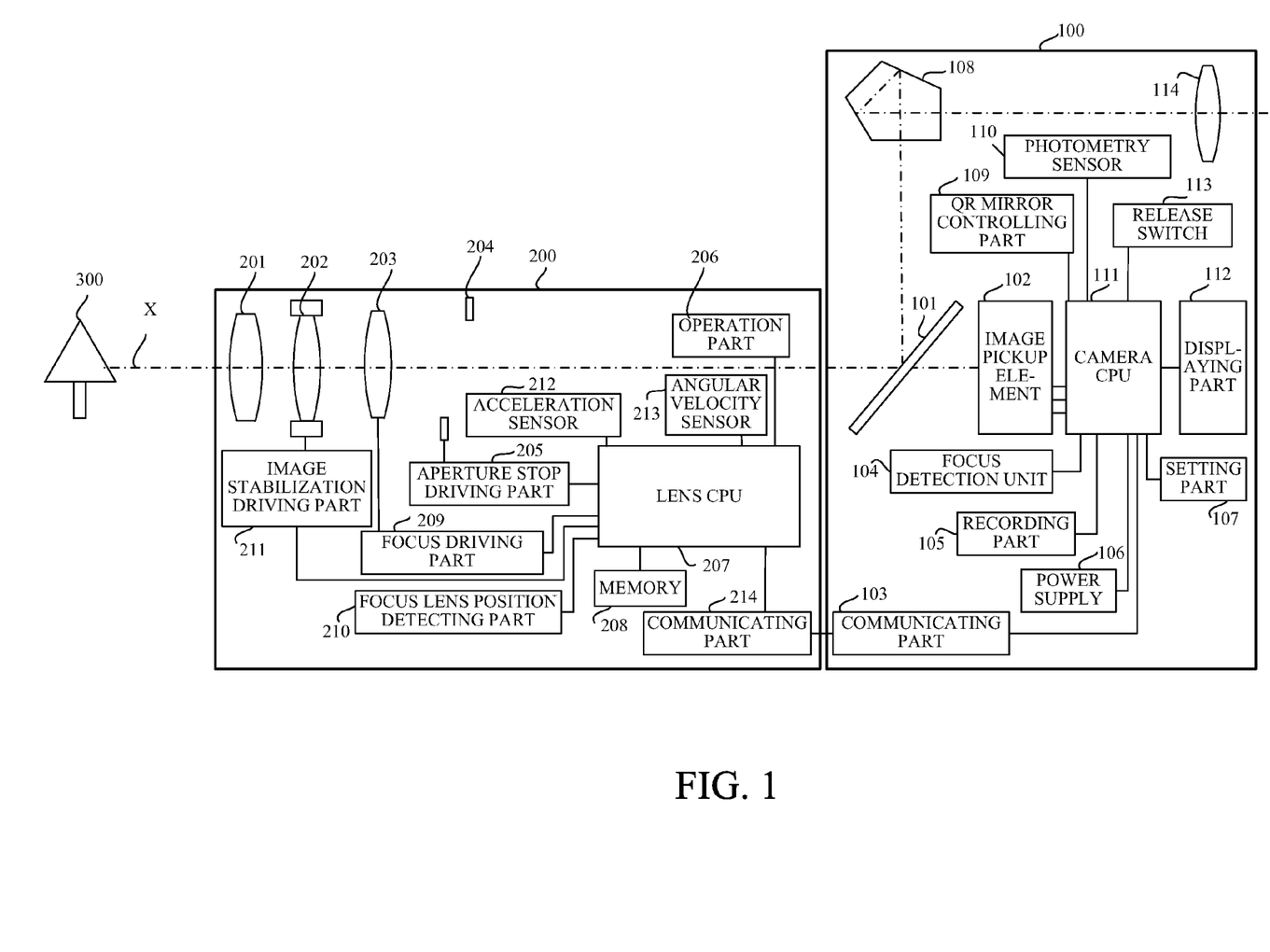
FIG. 1 is a block diagram showing a configuration of a camera system including an interchangeable lens that is Embodiment 1 of the present invention.

FIG. 1 shows a configuration of a camera system including a lens apparatus as an optical apparatus that is a first embodiment (Embodiment 1) of the present invention.

In FIG. 1, reference numeral 100 denotes a single lens reflex digital camera (image pickup apparatus, hereinafter simply referred to as "camera"). Reference numeral 200 denotes an interchangeable lens (lens apparatus) detachably attachable to the camera 100. The camera 100 and the interchangeable lens 200 constitute a camera system. The camera 100 may be a film camera.

A light flux from an object 300 passes through an image pickup optical system (201-204) housed in the interchangeable lens 200 and forms an image. The image pickup optical system includes a first optical system 201, an image stabilizing optical system 202 shiftable in a direction orthogonal to an optical axis x of the image pickup optical system, a focus lens 203 movable in a direction of the optical axis x (hereinafter referred to as "optical axis direction") for focusing, and an aperture stop 204 which adjusts an amount of light.

The interchangeable lens 200 of this embodiment is a fixed focal length macro lens with an image stabilization function whose focal length is 100 mm and full open F-number is 2.8.

The interchangeable lens 200 includes therein a focus driving part 209 which is constituted by a motor and a driving circuit thereof and moves the focus lens 203 in the optical axis direction, an image stabilization driving part 211 which is constituted by actuators and a driving circuit thereof and shifts the image stabilizing optical system 202 in the direction orthogonal to the optical axis. The focus driving part 209 and the image stabilization driving part 211 operate according to signals from a lens CPU 207.

Reference numeral 205 denotes an aperture stop driving part which drives the aperture stop 204 according to a signal from the lens CPU 207 to change an aperture diameter of the aperture stop 204.

Reference numeral 206 denotes an operation part which includes an AF/MF switch for switching between auto focus (AF) and manual focus (MF), and an IS switch for switching on/off of the image stabilization function.

The lens CPU 207 controls operations of the respective parts in the interchangeable lens 200 while communicating commands and information with a camera CPU 111 through a lens communicating part 214 provided in the interchangeable lens 200 and a camera communicating part 103 provided in the camera 100.

Reference numeral 210 denotes a focus lens position detector which detects a position of the focus lens 203 in the optical axis direction. Specifically, the focus lens position detector 210 includes a pulse generator which outputs pulse signals with rotation of the motor in the focus driving part 209. The lens CPU 207 first moves the focus lens 203 to a predetermined reference position and then detects the position of the focus lens 203 by counting the number of pulses of the pulse signals from the pulse generator.

The lens CPU 207 can detect a moving speed of the focus lens 203 on the basis of positional changes of the focus lens 203. The lens CPU 207 controls the movement of the focus lens 203 while monitoring the detected position and moving speed of the focus lens 203.

Reference numeral 208 denotes a memory constituted by a ROM or the like. The memory 208 stores various information on the interchangeable lens 200 such as specific identification information (ID), focal length information and focus sensitivity information which is a ratio of a movement amount of an image plane to a movement amount of the focus lens 203. Moreover, the memory 208 can store exposure delay information, which will be described later, of the camera 100 to which the interchangeable lens 200 is attached, and a focus shake amount which will be described later. The information stored in the memory 208 is read by the lens CPU 207 as needed.

Reference numeral 212 denotes an acceleration sensor which detects an acceleration of the interchangeable lens 200 (in other words, of the entire camera system) in the optical axis direction. A signal output from the acceleration sensor 212 according to focus shake that is shake of the interchangeable lens 200 in the optical axis direction is integrated twice to calculate the focus shake amount that is a displacement amount of the interchangeable lens 200 in the optical axis direction. A sensor which detects accelerations in directions of three axes including the optical axis x may be used as the acceleration sensor 212. Displacement amounts calculated by integrating accelerations in directions of two axes other than the optical axis x twice may be used for shift shake correction in a plane orthogonal to the optical axis x.

Reference numeral 213 denotes an angular velocity sensor as another shake detector. The angular velocity sensor 213 detects angular velocities in directions of two axes (a pitch direction and a yaw direction) orthogonal to the optical axis x and orthogonal to each other. Signals output from the angular velocity sensor 213 according to angular shakes that are shakes of the interchangeable lens 200 (in other words, of the entire camera system) in the pitch and yaw directions are integrated to calculate the angular shake amounts that are displacement amounts of the interchangeable lens 200 in the pitch and yaw directions.

The lens CPU 207 moves (shifts) the image stabilizing optical system 202 in the direction orthogonal to the optical axis x according to the angular shake amounts through the image stabilization driving part 211. The shift of the image stabilizing optical system 202 performs angular shake correction (angular image stabilization) to reduce image shake due to the angular shake. The drive of the image stabilizing optical system 202 may be controlled in combination with that for the above-described shift shake correction in the plane orthogonal to the optical axis x.

Moreover, the lens CPU 207 moves the focus lens 203 in the optical axis direction according to the focus shake amount through the focus driving part 209. The movement of the focus lens 203 performs focus shake correction (focus image stabilization) to reduce the focus shake that is a variation of a focus state.

The light flux entering the camera 100 from the image pickup optical system is divided by the quick return mirror 101 located in the image pickup optical path into a light flux proceeding to a viewfinder optical system which will be described later and a light flux proceeding to a focus detection unit 104 via a sub-mirror (not shown). In the state where the quick return mirror (hereinafter referred to as "QR mirror") 101 is located out of the image pickup optical path, the light flux from the image pickup optical system forms an image on an image pickup element 102 such as a CCD sensor and a CMOS sensor.

The camera 100 of this embodiment employs an electronic shutter which increases and decreases an exposure time period (charge accumulation time period) to control exposure of the image pickup element 102. Therefore, the camera 100 is not provided with a mechanical shutter such as a focal plane shutter.

However, the camera 100 may be provided with such a mechanical shutter.

The viewfinder optical system is constituted by a focusing plate (not shown), a penta prism 108 and an eyepiece lens 114, which allows a user to observe an object image formed on the focusing plate through the eyepiece lens 114.

Reference numeral 109 denotes a quick return mirror controlling part which controls upward/downward (move-out/move-in) operations of the QR mirror 101 with respect to the image pickup optical path according to a signal from the camera CPU 111.

Reference numeral 110 denotes a photometry unit which receives part of the light flux proceeding in the viewfinder optical system (that is, part of the light flux from the interchangeable lens 200) to measure object luminance (photometry information). The photometry information is sent to the camera CPU 111. The camera CPU 111 decides, on the basis of the photometry information, the aperture diameter (target aperture value) of the aperture stop 204 and the exposure time period (charge accumulation time period) of the image pickup element 102.

Reference numeral 104 denotes a focus detection unit which uses a TTL phase difference detection method to detect a focus state of the image pickup optical system, the focus state being shown by a phase difference between two object images. Information on the phase difference is input to the camera CPU 111. The camera CPU 111 calculates a driving amount of the focus lens 203 for obtaining an in-focus state on the basis of a defocus amount (defocus amount information) calculated from the phase difference and the focus sensitivity information received from the lens CPU 207. The lens CPU 207 receives information on the driving amount from the camera CPU 111 through the camera communicating part 103 and the lens communicating part 214, and drives the focus lens 203 in the optical axis direction through the focus driving part 209. The drive of the focus lens 203 performs the AF.

In the AF in this embodiment, the camera CPU 111 and the lens CPU 207 together control the movement (drive) of the focus lens 203. On the other hand, in the focus shake correction, the lens CPU 207 controls the movement (drive) of the focus lens 203 while obtaining necessary information from the camera CPU 111.

Reference numeral 113 denotes a release switch which is a two-stroke switch. A first stroke operation of the release switch 113 generates an exposure preparation starting signal (hereinafter referred to as "SW1 signal") to instruct an exposure preparation operation (also referred to as "image pickup preparation operation") including the above-described photometry, focus detection and AF. A second stroke operation of the release switch 113 generates an exposure starting signal (hereinafter referred to as "SW2 signal") to instruct the upward operation of the QR mirror 101 and start of the exposure of the image pickup element 102 for image pickup. These SW1 and SW2 signals are input to the camera CPU 111.

The "exposure" in this embodiment corresponds to an operation from start to end of charge accumulation of the image pickup element 102 for acquiring a still image for recording.

An output signal obtained by photoelectric conversion of the object image performed by the image pickup element 102 is converted by various processes performed by an image processing circuit (not shown) into a digital video signal. The digital video signal is input to the camera CPU 111. The camera CPU 111 generates a still image or a moving image using the digital video signal.

Moreover, the camera CPU 111 performs various control operations such as control of communication with the lens CPU 207, control of a displaying part 112 including an LCD, control in response to input signals from a setting part 107 for setting various operation modes, checking of a remaining battery level and power supply control.

The generated still image or moving image is recorded into a recording medium such as a semiconductor memory or an optical disc (not shown) in the recording part 105.

Next, operations performed by the camera CPU 111 and the lens CPU 207 will be described using a timing chart shown in FIG. 2.

When the SW1 signal is input to the camera CPU 111 in response to the first stroke operation of the release switch 113, the camera CPU 111 causes the focus detection unit 104 to perform the focus detection. Then, the camera CPU 111 calculates the driving amount (driving amount information) of the focus lens 203 on the basis of the defocus amount information obtained by the focus detection unit 104 and the focus sensitivity information read from the memory 208 through the lens CPU 207. The lens CPU 207 receives the driving amount information from the camera CPU 111 and then moves the focus lens 203 through the focus driving part 209 based on the driving amount information to achieve an in-focus state.

Moreover, the camera CPU 111 that has received the SW1 signal causes the photometry unit 110 to perform a photometry operation and then decides the aperture value and the exposure time period on the basis of the photometry information from the photometry unit 110.

Further, the camera CPU 111 that has received the SW1 signal activates the acceleration sensor 212 and the angular velocity sensor 213 through the lens CPU 207. The image stabilizing optical system 202 is started to be driven on the basis of the output signal from the angular velocity sensor 213. The lens CPU 207 integrates the output signal from the acceleration sensor 212 twice to convert it into the displacement amount (focus shake amount) at a predetermined cycle, and stores (accumulates) in the memory 208 plural focus shake amounts thus sequentially obtained.

Figure 2:
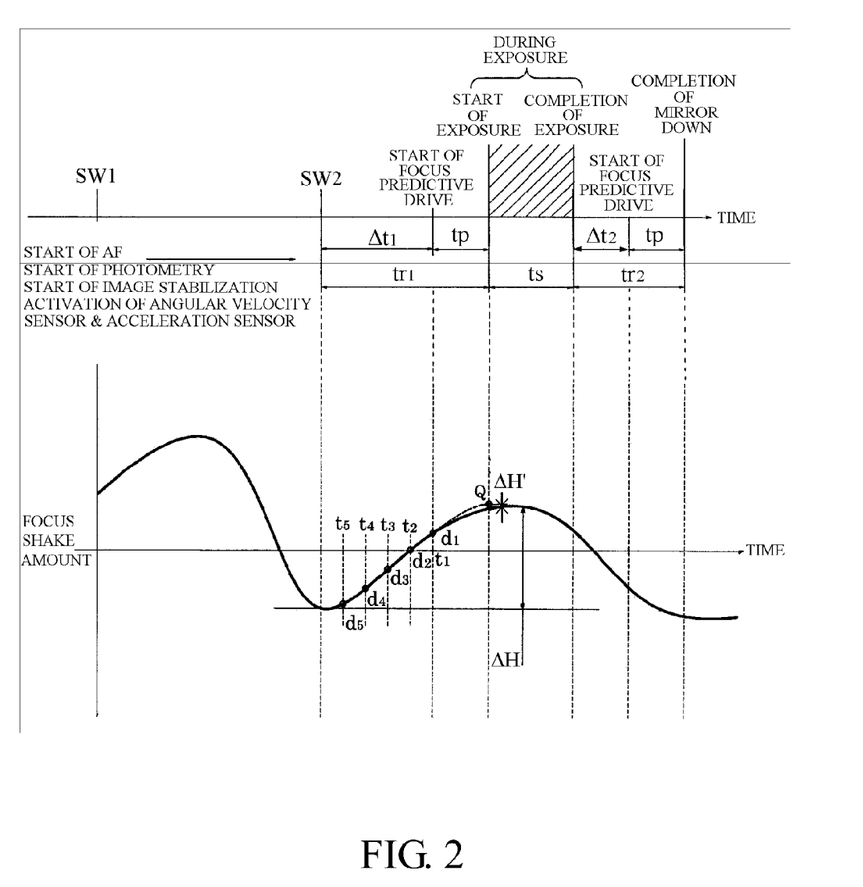
FIG. 2 is a figure showing a focus predictive drive performed in a period from start of an exposure preparation operation to a mirror downward operation, and variations of a focus shake amount (actual measurement value) in that period in the camera system of Embodiment 1

A curve shown in a lower part in FIG. 2 shows an example of actual focus shake amounts (actual measurement values) obtained on the basis of the output signal from the acceleration sensor 212.

In FIG. 2, the focus shake amounts accumulated in the memory 208 are a predetermined number (plurality) of focus shake amounts (for example, five focus shake amounts) continuously detected at the predetermined cycle and including a currently detected focus shake amount and at least one previously detected focus shake amount. When the predetermined number of focus shake amounts have already been accumulated, the most previously detected shake amount is deleted from the memory 208 and then the currently detected focus shake amount is newly stored in the memory 208.

Then, when the SW2 signal is input to the camera CPU 111, the camera CPU 111 starts the upward operation of the QR mirror 101 and sends SW2 input information which shows that the SW2 signal has been input thereto and information on the target aperture value to the lens CPU 207. The lens CPU 207 that has received the SW2 input information starts drive of the aperture stop 204 from a current aperture position (full open position) to an aperture position corresponding to the target aperture value. The upward operation of the QR mirror 101 stops the focus detection by the focus detection unit 104 and the AF. However, the acceleration sensor 212 normally operates, so that the focus shake can be detected.

Moreover, the lens CPU 207 calculates a time period required for driving the aperture stop 204 (hereinafter referred to as "aperture stop driving time period") from the current aperture position (full open position) to the aperture position corresponding to the target aperture value. The aperture stop driving time period from the full open position becomes longer as the aperture diameter corresponding to the target aperture value becomes smaller.

The lens CPU 207 determines (or decides or calculates) an exposure delay time period $tr_1$ based on the aperture stop driving time period and information relating to the camera 100 to which the interchangeable lens 200 is attached, the information relating to the camera 100 being received from the camera 100 and stored in the memory 208. The information relating to the camera 100 may be selectively read from model information of two or more cameras that can be used with the interchangeable lens 200 stored in the memory 208.

The exposure delay time period $tr_1$ is a time period from a time point at which the SW2 signal is generated in the camera 100, that is, from a time point at which the start of the exposure is instructed to a time point at which the exposure is actually started.

The "information relating to the camera 100" includes information on a model (type) of the camera 100. A time period required for the upward operation of the QR mirror 101 (hereinafter referred to as "mirror driving time period") is unique to each model of the camera. Therefore, the mirror driving time periods of the respective camera models to which the interchangeable lens 200 is attached are different from each other, so that the exposure delay time period $tr_1$ can be determined by the mirror driving time period.

The "information relating to the camera 100" further includes information on an image pickup mode of the camera 100. The camera 100 has a normal image pickup mode in which the QR mirror 101 is operated upward from a state where an object can be observed through the viewfinder optical system and then image pickup is performed, and a live view image pickup mode in which image pickup is performed from a state where a live view image (electronic viewfinder image) is displayed on the displaying part 112 while the QR mirror 101 is kept at its up position. The normal image pickup mode takes a longer time from the time point at which the SW2 signal is generated to the time point at which the exposure is started than that in the live view image pickup mode by the mirror driving time period. Thus, the exposure delay time period $tr_1$ can be determined also by the information on the image pickup mode.

For example, when a delay time period obtained from the information relating to the camera 100 is 60 msec and the aperture stop driving time period is 35 msec, the exposure delay time period $tr_1$ is determined to be 60 msec which is the longer one thereof. Moreover, when a delay time period obtained from the information relating to the camera 100 is 35 msec and the aperture stop driving time period is 40 msec, the exposure delay time period $tr_1$ is determined to be 40 msec which is the longer one thereof.

As described above, this embodiment determines the exposure delay time period $tr_1$, that is, a start time point of the exposure which is a target time point for calculation of a predictive focus shake amount based on at least one of the time period required for operations of elements (such as the aperture stop 204 and the QR mirror 101) which operate before the start of the exposure in response to the start instruction of the exposure and the image pickup mode. This makes it possible to accurately calculate the predictive focus shake amount for the start time point of the exposure.

Moreover, the memory 208 stores information on a focus shake correction driving time period tp for each image pickup magnification (in other words, each position of the focus lens 203) and each aperture value. The focus shake correction driving time period tp is a time period required for driving the focus lens 203 from a position at the time point at which the SW2 signal is generated to a position at which a predetermined maximum focus shake amount can be corrected. In other words, the focus shake correction driving time period tp is a time period within which the focus lens 203 can be driven to a position corresponding to a largest focus shake amount which may be generated in the exposure delay time period $tr_1$.

The lens CPU 207 that has received the SW2 input information acquires a position of the focus lens 203 detected by the focus lens position detector 210 at a time point of reception of the SW2 input information, and reads the focus shake correction driving time period tp corresponding to the detected position of the focus lens 203 from the memory 208. Then, during a time period $\Delta t_1$ obtained by subtracting the focus shake correction driving time period tp from the exposure delay time period $tr_1$, the lens CPU 207 reads the predetermined number of focus shake amounts which are sequentially stored in the memory 208 up to a time point of the reading.

In addition, the lens CPU 207 sequentially calculates at the predetermined cycle the predictive focus shake amount which is a predictive value of the focus shake amount for a time point of elapse of the exposure delay time period $tr_1$, that is, for the start time point of the exposure based on the predetermined number of the focus shake amounts read from the memory 208. A method for calculating the predictive focus shake amount will be described later.

The lens CPU 207 starts drive of the focus lens 203 at the time point of elapse of the time period $\Delta t_1$ (before the start of the exposure) to a position corresponding to a latest predictive focus shift amount at this timing, that is, a position for correcting a focus shift (defocus) caused due to the latest predictive focus shift amount. As described above, this drive of the focus lens 203 is finished within the focus shake correction driving time period tp. In other words, the drive of the focus lens 203 for the focus shake correction at the start time point of the exposure is started and completed before the start of the exposure.

When the drive of the focus lens 203 has completed and the exposure delay time period $tr_1$ has elapsed, the camera CPU 111 starts the exposure of the image pickup element 102. After the decided exposure time period is has elapsed, the camera CPU 111 completes the exposure and then starts the downward operation of the QR mirror 101.

During the exposure (after the start of the exposure), the calculation of the focus shake amount from the output of the acceleration sensor 212 and the storage (accumulation) of the calculated focus shake amount to the memory 208 are continued at the predetermined cycle. Then, a predictive focus shake amount for a time point at which next exposure is allowed (exposure allowable time point) after the downward operation of the QR mirror 101 has completed is sequentially calculated by using a similar calculation method to that for calculating the predictive focus shake amount for the start time point of the exposure. Hereinafter, the predictive focus shake amount for the time point at which the next exposure is allowed is referred to as "predictive focus shake amount for a completion time point of mirror down".

A delay time period from a completion time point of the exposure to the completion time point of mirror down is defined as "after exposure delay time period $tr_2$". The after exposure delay time period $tr_2$ is also determined from the above-described information relating to the camera 100.

After a time period $\Delta t_2$ ($<tr_2$) has elapsed from the completion time point of the exposure, drive of the focus lens 203 to a position corresponding to the predictive focus shake amount for the completion time point of mirror down is started. This drive of the focus lens 203 also completes within the focus shake correction driving time period tp. Therefore, this drive of the focus lens 203 completes before a time point of elapse of the after exposure delay time period $tr_2$, that is, before the completion time point of mirror down.

The above-described operation enables the user performing image pickup with the viewfinder optical system to observe the object in an in-focus state while the object can be viewed through the viewfinder optical system. Therefore, the user can perform next image pickup without uncomfortable feeling. This is especially effective for continuous image pickup.

Next, description will be made of an example of the method for calculating the predictive focus shake amount for the start time point of the exposure. The description will be made of a case where the lens CPU 207 calculates the predictive focus shake amount after the focus shake correction driving time period tp by using five focus shake amounts detected continuously from a past time to a current time.

The use of the five focus shake amounts enables approximate calculation of the predictive focus shake amount with four-order polynomial.

The number of the focus shake amounts used for the calculation of the predictive focus shake amount may be optional if it is a plural number.

Accuracy of the predictive focus shake amount increases as the number of the focus shake amounts increases since the approximate calculation can be performed with a higher-order polynomial.

The output of the acceleration sensor 212 is sampled at, for example, 0.5 msec intervals. Then, an average value (average acceleration) of two sampled accelerations is calculated, and the average acceleration is integrated twice to calculate the focus shake amount. In other words, the focus shake amount is newly calculated (detected) at each 1 msec intervals (that is, at the predetermined cycle).

Among the five focus shake amounts sequentially detected, a latest focus shake amount detected at the current time point is represented by $d_1$, and a focus shake amount detected one time ago is represented by $d_2$. Further, focus shake amounts detected two, three and four times ago are represented by $d_3$, $d_4$ and $d_5$, respectively. The time points (1 msec intervals) at which the focus shake amounts $d_1$, $d_2$, $d_3$, $d_4$ and $d_5$ are detected are represented by $t_1$, $t_2$, $t_3$, $t_4$ and $t_5$, respectively.

The time point $t_1$ shown in FIG. 2 is a time point immediately before the time period $\Delta t_1$ elapses from the time point of reception of the SW2 input information (time point of generation of the SW2 signal).

The predictive focus shake amount can be calculated from the focus shake amounts $d_1$ to $d_5$ and the detection time points $t_1$ to $t_5$ by the approximate calculation with the four-order polynomial shown by the following expression (1) which uses a least-squares method. In the expression (1), y represents the predictive focus shake amount, and x represents a time point. Moreover, $a_0$, $a_1$, $a_2$, $a_3$ and $a_4$ represent constants.

$$y = f(x) = a_0 + a_1 x + a_2 x^2 + a_3 x^3 + a_4 x^4 \quad (1)$$

The focus shake amounts $d_1$ to $d_5$ and the detection time points $t_1$ to $t_5$ are substituted into the expression (1) to calculate the constants $a_0$ to $a_4$, and then a value of y when a value of x is the focus shake correction driving time period tp is calculated. In other words, on the basis of the five focus shake amounts detected before elapse of the time period $\Delta t_1$, the predictive focus shake amount for the time point of elapse of the focus shake correction driving time period tp from the time point of the elapse of the time period $\Delta t_1$ is calculated.

A difference between an actual focus shake amount caused at the time point of the generation of the SW2 signal and an actual focus shake amount at the time point of the exposure is defined as $\Delta H$. In this case, if the calculation of the predictive focus shake amount for the start time point of the exposure and the drive of the focus lens 203 based thereon (hereinafter these are collectively referred to as "focus predictive drive") are performed before the start of the exposure, a large focus shift corresponding to $\Delta H$ is generated.

However, if the focus predictive drive is performed before the start of the exposure and the predictive focus shake amount at that time is Q, the difference between the actual focus shake amounts is $\Delta H_1$ significantly smaller than $\Delta H$, which enables the exposure without such a large focus shift.

Although FIG. 2 showed the case where all of the focus shake amounts used for calculating the predictive focus shake amount are detected and stored after the generation of the SW2 signal, it is not necessarily necessary that all of the focus shake amounts be detected and stored after the generation thereof. In other words, if part of the focus shake amounts is detected and stored after the generation of the SW2 signal, the remaining one or more may be detected and stored before the generation thereof. In further other words, it is only necessary that at least one focus shake amount detected after the generation of the SW2 signal be included in the focus shake amounts used for calculating the predictive focus shake amount.

Figure 3:
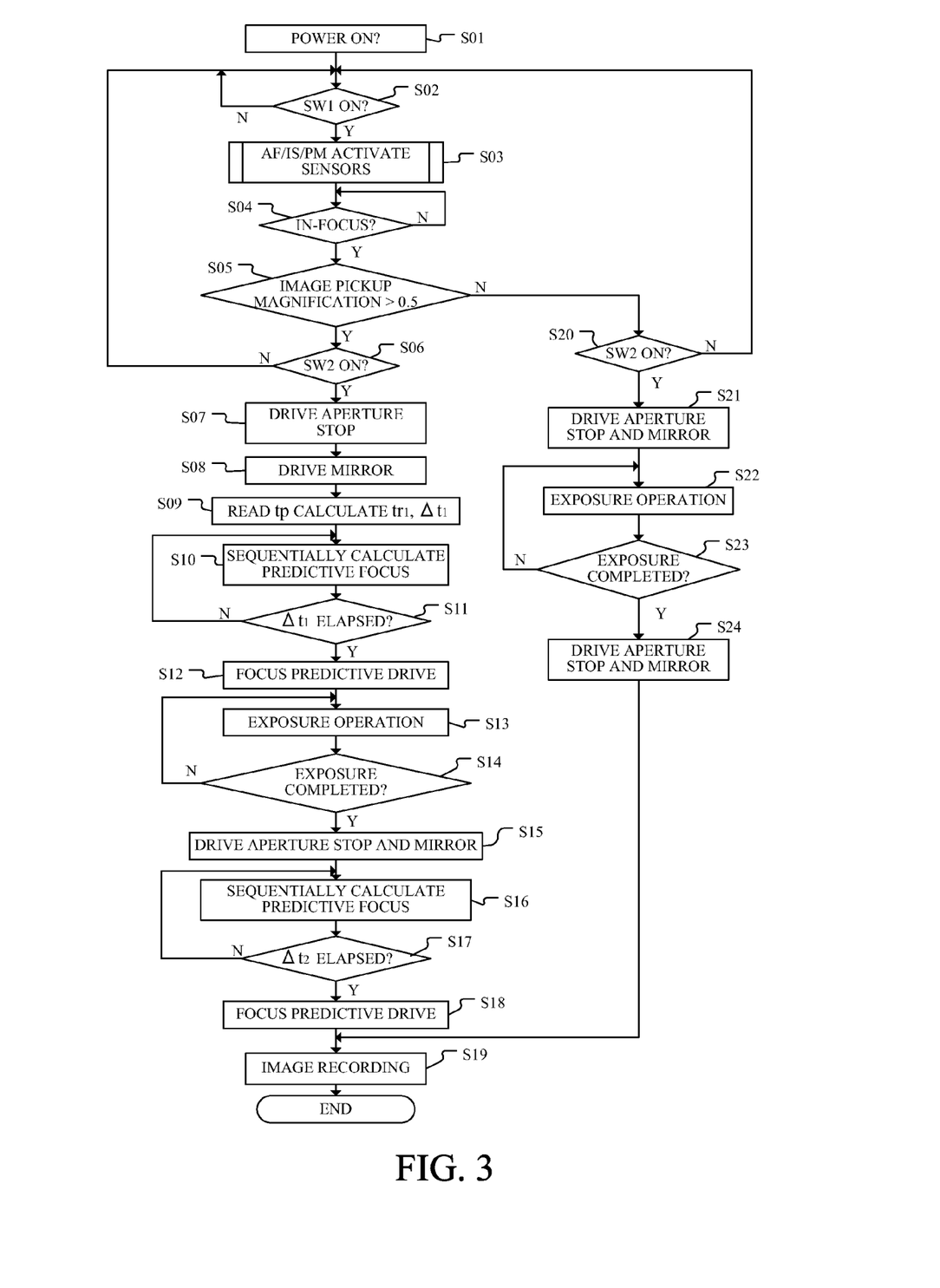
FIG. 3 is a flowchart showing operations of the camera system of Embodiment 1.

Next, description will be made of operations of the entire camera system including the focus predictive drive shown in FIG. 2 with reference to FIG. 3. The operations are executed according to computer programs stored in the camera CPU 111 and the lens CPU 207.

When power of the camera 100 is turned on at step S01, the power is supplied from the camera 100 to the interchangeable lens 200 and then the communication between the camera CPU 111 and the lens CPU 207 is started. The camera CPU 111 and the lens CPU 207 respectively recognize the interchangeable lens 200 and the camera 100 mutually attached, and send and receive necessary information therebetween. Further, in the live view image pickup mode, images obtained by using the image pickup element 102 are displayed on the displaying part 112.

At step S02, the camera CPU 111 determines whether or not the SW1 signal has been input thereto from the release switch 113. If the SW1 signal has been input, the process proceeds to step S03.

At step S03, the camera CPU 111 performs the AF and the photometry (PM), and decides the target aperture value on the basis of the photometry result. The lens CPU 207 activates the angular velocity sensor 213 and the acceleration sensor 212. Then, the lens CPU 207 starts the angular shake correction (image stabilization) on the basis of the output from the angular velocity sensor 213, and also starts the storage of the focus shake amounts obtained from the output from the acceleration sensor 212 into the memory 208.

Next, at step S04, the camera CPU 111 determines whether or not an in-focus state has been obtained by the AF. If the in-focus state has been obtained, the process proceeds to step S05. The lens CPU 207 calculates the image pickup magnification from the position of the focus lens 203 detected by the focus lens position detector 210 at that time.

At step S05, the lens CPU 207 determines whether or not the image pickup magnification calculated at step S04 is larger than a predetermined value (for example, 0.5). The process proceeds to step S06 if the image pickup magnification is larger than the predetermined value, and the process proceeds to step S20 if the image pickup magnification is smaller than the predetermined value.

The predetermined value is not necessary to be 0.5, and may be changed depending on focus sensitivity determined by a focal length of the interchangeable lens 200 or the like. Further, if the image pickup magnification is smaller than the predetermined value (that is, when the focus predictive drive is not performed), a conventional AF operation may be performed.

At step S06, the camera CPU 111 determines whether or not the SW2 signal has been input thereto. If the SW2 signal has been input, the process proceeds to step S07 where the camera CPU 111 sends the SW2 input information to the lens CPU 207. If the SW2 signal has been input, the process returns to step S02.

At step S07, the camera CPU 111 sends the target aperture value decided on the basis of the photometry result at step S03 to the lens CPU 207. The lens CPU 207 drives the aperture stop 204 from a current aperture position to an aperture position corresponding to the target aperture value.

Next, at step S08, the camera CPU 111 causes the QR mirror 101 to perform the upward operation through the quick return mirror controlling part 109.

At step S09, the lens CPU 207 reads the focus shake correction driving time period tp according to the image pickup magnification calculated at step S04 and the target aperture value from the memory 208. Further, the lens CPU 207 calculates the aperture stop driving time period based on the target aperture value, and then determines (calculates) the exposure delay time period $tr_1$ based on the aperture stop driving time period and the above-described information relating to the camera 100. Moreover, the lens CPU 207 calculates the time period $\Delta t_1$ from the exposure delay time period $tr_1$ and the focus shake correction driving time period tp.

At step S10, the lens CPU 207 starts the calculation of the predictive focus shake amount for the start time point of the exposure based on the detection results of the five focus shake amounts accumulated in the memory 208. Then, the lens CPU 207 sequentially calculates the predictive focus shake amount for the start time point of the exposure at the predetermined cycle.

At step S11, the lens CPU 207 determines whether or not the time period $\Delta t_1$ has elapsed from the time point of the reception of the SW2 input information at step S06. If the time period $\Delta t_1$ has elapsed, the process proceeds to step S12.

At step S12, the lens CPU 207 drives, on the basis of the latest predictive focus shake amount at the time point of the elapse of the time period $\Delta t_1$, the focus lens 203 to a position corresponding to the latest predictive focus shake amount within the focus shake correction driving time period tp. After completion of the drive of the focus lens 203, the lens CPU 207 sends information showing the completion of the drive of the focus lens 203 to the camera CPU 111. Then, the process proceeds to step S13.

At step S13, the camera CPU 111 starts the exposure of the image pickup element 102. Next, at step S14, the camera CPU 111 determines whether or not the exposure time period ts has elapsed. If the exposure time period ts has not elapsed, the camera CPU 111 repeats the determination at step S13. If the exposure time period ts has elapsed, the process proceeds to step S15.

At step S15, the lens CPU 207 drives the aperture stop 204 to the full open position in response to reception of information showing completion of the exposure sent from the camera CPU 111. The camera CPU 111 causes the QR mirror 101 to perform the downward operation.

At step S16, the lens CPU 207 sequentially calculates the predictive focus shake amount for the completion time point of mirror down during the time period $\Delta t_2$ corresponding to a difference between the after exposure delay time period $tr_2$ and the focus shake correction driving time period tp.

Then, at step S17, the lens CPU 207 determines whether or not the time period $\Delta t_2$ has elapsed. If the time period $\Delta t_2$ has elapsed, the process proceeds to step S18.

At step S18, the lens CPU 207 drives, on the basis of a latest predictive focus shake amount for the completion time point of mirror down, the focus lens 203 to a position corresponding to the latest predictive focus shake amount for the completion time point of mirror down. After completion of the drive of the focus lens 203, the downward operation of the QR mirror 101 is completed and the drive of the aperture stop 204 to the full open position is also completed. Therefore, the user can observe an object image in an in-focus state through the viewfinder optical system.

At step S19, the camera CPU 111 records the image captured by image pickup to the recording part 105 and then ends this sequence.

On the other hand, processing at steps S20 to S24 performed when the image pickup magnification is determined to be smaller than the predetermined value at step S05 corresponds to processing not performing the focus predictive drive performed at steps S06 to S18.

The process at step S20 is similar to that at step S06, and the process at step S21 is similar to that at steps S07 and S08.

Moreover, at step S22, the camera CPU 111 1 performs the exposure of the image pickup element 102 as at step S13. When detecting completion of the exposure at step S23, the camera CPU 111 at step S24 drives the aperture stop 204 to the full open position and causes the QR mirror 101 to perform the downward operation. Then, the process proceeds to step S19.

As described above, this embodiment calculates, in response to the start instruction of the exposure and before the start of the exposure, the predictive focus shake amount for the time point of the exposure (the start time point of the exposure in this embodiment), and moves the focus lens 203 to the position corresponding to the predictive focus shake amount before the start of the exposure. Therefore, this embodiment can reduce the effect of the focus shake in image pickup regardless of presence of magnification variations due to the movement of the focus lens 203.

Further, this embodiment performs the focus predictive drive under a condition in which the image pickup magnification is larger than the predetermined value. Therefore, this embodiment can reduce power consumption when an image pickup magnification at which the effect of the focus shake is small is set.

Moreover, this embodiment decides the exposure delay time period $tr_1$ based on at least one of the model information of the camera 100, the image pickup mode information, the setting value of the aperture stop in the image pickup optical system and the exposure time period. Therefore, this embodiment can increase accuracy of the focus predictive drive.

Furthermore, although this embodiment calculates the focus shake amount in the optical axis direction by twice integrations of the output from the acceleration sensor, the focus shake amount may be calculated based on the outputs from the acceleration sensor and the angular velocity sensor.

Embodiment 2

Next, description will be made of a second embodiment (Embodiment 2) of the present invention with reference to FIG. 4. In this embodiment, components common to those in Embodiment 1 are denoted by the same reference numerals as those in Embodiment 1 (FIG. 1). Basic operations and processing of a camera system in this embodiment are the same as those in Embodiment 1.

Embodiment 1 calculates the predictive focus shake amount for the start time point of the exposure as the time point of the exposure. In contrast thereto, this embodiment calculates a predictive focus shake amount for a specific time point in a period from the start time point of the exposure to a completion time point of the exposure (hereinafter referred to as "during the exposure") as the time point of the exposure. Then, this embodiment drives the focus lens 203 to a position corresponding to the predictive focus shake amount for the specific time point, within the focus shake correction driving time period tp before the start of the exposure (after the elapse of the time period $\Delta t_1$ from the time point of the generation of the SW2 signal).

The "specific time point during the exposure" is preferably, for example, a time point at which a half (ts/2) of the exposure time period is elapses from the start of the exposure.

Figure 4:
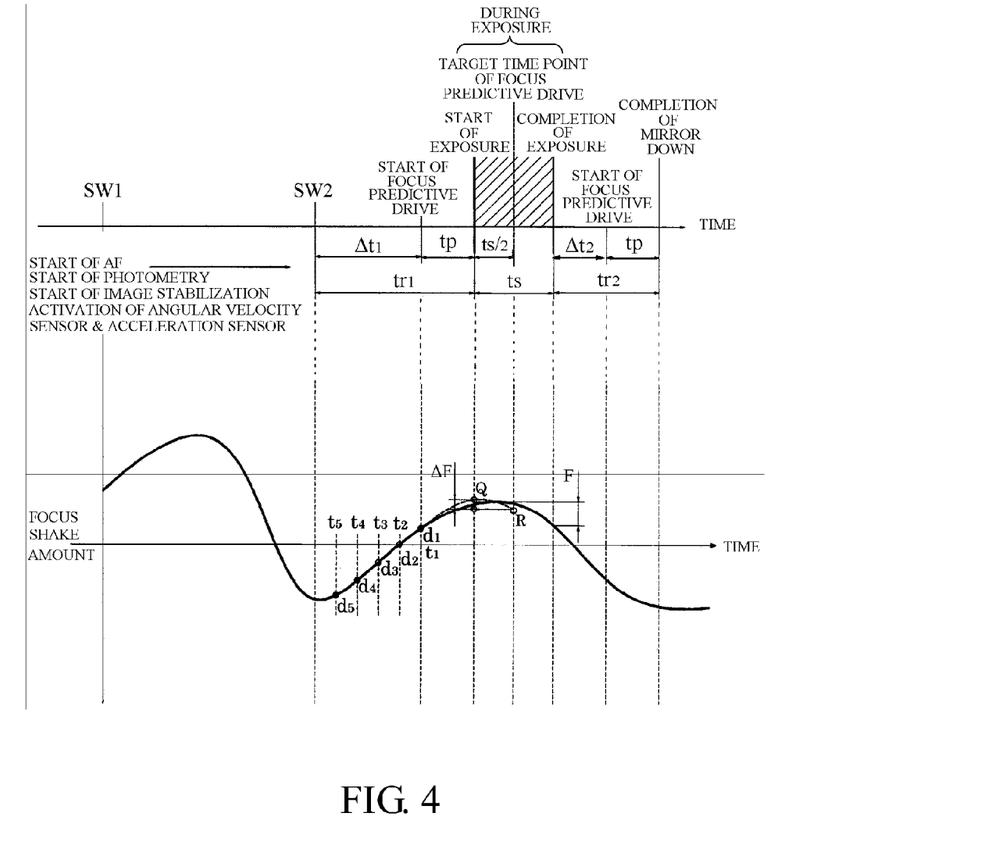
FIG. 4 is a figure showing focus predictive drive performed in a period from start of an exposure preparation operation to a mirror downward operation, and variations of a focus shake amount (actual measurement value) in that period in a camera system that is Embodiment 2 of the present invention.

In FIG. 4, the predictive focus shake amount for the time point at which the half (ts/2) of the exposure time period elapses from the start of the exposure is R. This predictive focus shake amount R is calculated using the focus shake amounts $d_1$ to $d_5$ at the time points $t_1$ to $t_5$ used for calculating the predictive focus shake amount Q for the start time point of the exposure in Embodiment 1 (FIG. 2). A difference between the predictive focus shake amount R for the time point at which the half (ts/2) of the exposure time period elapses from the start of the exposure and the predictive focus shake amount Q for the start time point of the exposure is AF.

In FIG. 4, the focus shake amount (actual measurement value) during the exposure changes within a variation range of F. Image pickup with a small effect of the focus shake can be performed in a state where the focus lens 203 is located at a position corresponding to a focus shake amount which is a central value of the variation range of F or a value close thereto.

The predictive focus shake amount R for the time point at which the half (ts/2) of the exposure time period elapses from the start of the exposure has a smaller difference from the central value of the variation range of F of the actual focus shake amount, as compared with the predictive focus shake amount Q for the start time point of the exposure. Therefore, moving the focus lens 203 to a position corresponding to the predictive focus shake amount R enables acquisition of an image with a smaller effect of the focus shake.

The camera CPU 111 sends information on the exposure time period ts set based on the photometry information obtained by the photometry unit 110 to the lens CPU 207, and the lens CPU 207 can calculate the time period ts/2 using the information on the exposure time period ts.

This embodiment determines the specific time point during the exposure which is a target time point for calculation of the predictive focus shake amount based on at least one of the time period required for operations of the elements (such as the aperture stop 204 and the QR mirror 101) which operate before the start of the exposure in response to the start instruction of the exposure, the image pickup mode and the exposure time period. This makes it possible to accurately calculate the predictive focus shake amount for the specific time point during the exposure.

This embodiment also performs the focus predictive drive in the time period from the completion time point of the exposure to the completion time point of mirror down at which the next exposure is allowed, as in Embodiment 1.

As described above, this embodiment calculates the predictive focus shake amount for the specific time point (intermediate time point) during the exposure and performs the focus predictive drive to the position corresponding to the predictive focus shake amount before the start of the exposure. This enables further reduction of the effect of the focus shake in the exposure time period on image pickup.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, although the above embodiments used the acceleration sensor as a shake detector, other sensors may be used as the shake detector.

Moreover, although the above embodiments described the lens-interchangeable single lens reflex camera, an alternative embodiment of the present invention may be a lens-integrated digital camera as an optical apparatus. In this case, in the AF and the focus shake correction, the drive of the focus lens can be controlled by a single CPU or separate CPUs provided in the camera.

What is claimed is:

1. An optical apparatus used for image pickup, comprising:
   an image pickup optical system including a focus lens;
   a controller configured to control movement of the focus lens in an optical axis direction of the image pickup optical system;
   a shake detector configured to detect a shake amount of the optical apparatus in the optical axis direction; and
   a memory configured to store plural shake amounts sequentially detected by the shake detector,
   wherein the controller calculates, in response to a start instruction of exposure for the image pickup and before start of the exposure, a predictive value of the shake amount for a time point of the exposure based on the plural shake amounts stored in the memory, the plural shake amounts including at least one shake amount detected after the start instruction of exposure,
   wherein the controller moves the focus lens to a position corresponding to the predictive value before the start of the exposure, and
   wherein the controller moves the focus lens to the position corresponding to the predictive value under a condition in which an image pickup magnification is larger than a predetermined value.

2. The optical apparatus according to claim 1, wherein the time point of the exposure is a start time point of the exposure.

3. The optical apparatus according to claim 1, wherein the time point of the exposure is an intermediate time point during the exposure.

4. The optical apparatus according to claim 1, wherein the controller determines the time point of the exposure which is a target time point for calculation of the predictive value based on at least one of a time period required for operations of elements which operate before the start of the exposure in response to the start instruction of exposure, an image pickup mode and an exposure time period.

5. The optical apparatus according to claim 1,
   wherein the memory stores two or more shake amounts sequentially detected by the shake detector after the start of the exposure, wherein the controller calculates, in response to completion of the exposure and before an exposure allowable time point at which next exposure is allowed, a next predictive value of the shake amount for the exposure allowable time point based on the two or more shake amounts stored in the memory, and wherein the controller moves the focus lens to a position corresponding to the next predictive value before the exposure allowable time point.

6. The optical apparatus according to claim 1, wherein, after the controller moves the focus lens to the position corresponding to the predictive value before the start of the exposure, the focus lens is stopped at the position corresponding to the predictive value during the exposure.

7. The optical apparatus according to claim 1, further comprising an image stabilizing optical system shiftable in a direction orthogonal to the optical axis.

8. A camera system comprising:
an image pickup apparatus performing image pickup; and
an interchangeable lens detachably attachable to the image pickup apparatus,
wherein the interchangeable lens comprises:
an image pickup optical system including a focus lens;
a controller configured to control movement of the focus lens in an optical axis direction of the image pickup optical system;
a shake detector configured to detect a shake amount of the optical apparatus in the optical axis direction; and
a memory configured to store plural shake amounts sequentially detected by the shake detector,
wherein the controller calculates, in response to a start instruction of exposure for the image pickup and before start of the exposure, a predictive value of the shake amount for a time point of the exposure based on the plural shake amounts stored in the memory, the plural shake amounts including at least one shake amount detected after the start instruction of exposure,
wherein the controller moves the focus lens to a position corresponding to the predictive value before the start of the exposure, and wherein the controller moves the focus lens to the position corresponding to the predictive value under a condition in which an image pickup magnification is larger than a predetermined value.

9. The camera system according to claim 8, wherein the time point of the exposure is a start time point of the exposure.

10. The camera system according to claim 8, wherein the time point of the exposure is an intermediate time point during the exposure.

11. The camera system according to claim 8, wherein the controller determines the time point of the exposure which is a target time point for calculation of the predictive value based on at least one of a time period required for operations of elements which operate before the start of the exposure in response to the start instruction of exposure, an image pickup mode and an exposure time period.

12. The camera system according to claim 8, wherein the memory stores two or more shake amounts sequentially detected by the shake detector after the start of the exposure, and wherein the controller calculates, in response to completion of the exposure and before an exposure allowable time point at which next exposure is allowed, a next predictive value of the shake amount for the exposure allowable time point based on the two or more shake amounts stored in the memory, and wherein the controller moves the focus lens to a position corresponding to the next predictive value before the exposure allowable time point.

13. The camera system according to claim 8, wherein, after the controller moves the focus lens to the position corresponding to the predictive value before the start of the exposure, the focus lens is stopped at the position corresponding to the predictive value during the exposure.

14. The camera system according to claim 8, further comprising an image stabilizing optical system shiftable in a direction orthogonal to the optical axis.

* * * * *